United States Patent

Agano

[11] Patent Number: 6,072,513
[45] Date of Patent: Jun. 6, 2000

[54] METHOD OF DENSITY CORRECTION AND AN IMAGE RECORDING APPARATUS

[75] Inventor: Toshitaka Agano, Kanagawa, Japan

[73] Assignee: Fuji Photo Film Co., Ltd., Kanagawa, Japan

[21] Appl. No.: 08/814,824

[22] Filed: Mar. 11, 1997

[30] Foreign Application Priority Data

| Mar. 11, 1996 | [JP] | Japan | 8-052942 |
| Mar. 26, 1996 | [JP] | Japan | 8-069720 |
| Mar. 27, 1996 | [JP] | Japan | 8-071947 |

[51] Int. Cl.$^7$ .......................................... B41J 2/05
[52] U.S. Cl. ........................................ 347/188; 347/183
[58] Field of Search .................................... 347/183, 188, 347/211, 298, 19, 14; 400/120.09, 120.13; 358/298, 455, 456, 501; 395/109

[56] References Cited

U.S. PATENT DOCUMENTS

| 4,827,279 | 5/1989 | Lubinsky et al. | 347/188 |
| 5,422,664 | 6/1995 | Stephany | 347/14 |
| 5,508,826 | 4/1996 | Lloyd et al. | 358/501 |
| 5,710,871 | 1/1998 | Tadenuma et al. | 395/109 |

FOREIGN PATENT DOCUMENTS

| 59-83150 | 5/1984 | Japan | G03B 41/16 |
| 8-80671 | 3/1986 | Japan | B41M 5/26 |
| 3-208668 | 9/1991 | Japan | B41J 2/32 |
| 5-104768 | 4/1993 | Japan | B41J 2/36 |
| 8-333724 | 12/1996 | Japan | B41M 5/28 |

*Primary Examiner*—N. Le
*Assistant Examiner*—Anh T. N. Vo
*Attorney, Agent, or Firm*—Sughrue, Mion, Zinn, Macpeak & Seas, PLLC

[57] ABSTRACT

In image recording, density correction is performed by an improved method in which the image densities on a density correcting reference chart that have known densities which are associated with a visual density are measured with a densitometer for setting the density correcting conditions, the correcting conditions for correcting the values of measurement with the densitometer such that they coincide with the image densities on the reference chart are constructed from the image densities on the reference chart and the values of measurement with the densitometer, and the density correcting conditions are set in accordance with the constructed density correcting conditions. Alternatively, the density correcting conditions are set in consideration of a threshold for color formation to occur in the thermal recording material or the maximum heating time in thermal recording is controlled. In accordance with these methods and using an apparatus in which they are implemented, appropriate density correcting conditions can be set irrespective of the individual differences between densitometers used in the setting operation and satisfactory tones can be reproduced even in highlight density areas, thereby achieving consistent formation of high-quality images which feature effective reproduction of the desired gradation.

2 Claims, 8 Drawing Sheets

METHOD OF DENSITY CORRECTION AND AN IMAGE RECORDING APPARATUS

BACKGROUND OF THE INVENTION

This invention relates to a method of density correction as applied to image recording in a dry system such as image recording of a type that employs recording materials which are not subjected to wet processing, especially thermal recording materials which produce densities by color formation with dyes as in thermal recording with a thermal head, and light-sensitive and/or thermal recording materials or thermally processable light-sensitive recording materials in the image recording with at least one laser beam and thermal development or in the thermal recording with heat of the laser beam or the thermal head. The invention also relates to an image recording apparatus.

Well known in the art are a digital radiographic system using a stimulable phosphor sheet, as well as CT (computer tomography), MR (magnetic resonance imaging) and other medical image recording apparatus. Conventionally, these apparatus have been operated by a "wet system", in which silver salt photographic materials carrying taken pictures or recorded images are subjected to wet processing to yield reproduced images. As an alternative method, a "dry system" has recently drawn increasing attention and an apparatus using thermal recording materials or thermally processable light-sensitive recording materials is one of such recent approaches. A problem with this dry system is that in order to meet the requirement of the medical industry for producing high-quality images, these materials must have high sensitivity.

Conventionally, in addition to organic silver salt, dyes are used as color forming means to produce densities in various image recording processes of the dry system. For example, thermal recording films (hereunder referred to as "thermal materials") comprising a thermal recording layer on a film substrate are commonly used to record images produced in diagnosis by ultrasonic scanning. This recording method, commonly referred to as thermal image recording, eliminates the need for wet processing and offers several advantages including convenience in handling. Hence, the use of the thermal image recording system is not limited to small-scale applications such as diagnosis by ultrasonic scanning and an extension to those areas of medical diagnoses such as CT, MRI and X-ray photography where large and high-quality images are required is under review.

As is well known, the thermal recording apparatus uses the thermal head having a glaze in which heat generating resistors corresponding to the number of pixels of one line are arranged in one direction and, with the glaze a little pressed against the thermal recording layer of the thermal film, the thermal film is relatively moved in a direction approximately perpendicular to the direction in which the heat generating resistors are arranged, and the respective heat generating resistors of the glaze are heated in accordance with the image data to be recorded to heat the thermal recording layer imagewise, thereby accomplishing image reproduction.

Not only in this thermal recording system but also in various other image recording apparatus such as laser printers and printing platemaking apparatus, image data (image information) on the image to be recorded are received from an image data supply source such as a diagnostic measuring apparatus or an image reading apparatus and various image processing steps such as sharpness enhancement and shading correction are performed on the received image data to produce image data for final image recording and the desired image is accordingly recorded on a recording material.

One of the important requirements of the image recording apparatus is that images of predetermined densities be always produced in accordance with the image data received from the above-mentioned image data supply source. Take, for example, an apparatus that receives image data as 10-bit digital data and which performs image recording on the basis of the received image data; if digital data representing 300 corresponds to a density (D) of 1.2, it is required that the apparatus produce an image at the density of 1.2 whenever it receives digital data representing 300.

However, image recording apparatus have individual differences and the density of the recorded image is also influenced by such factors as the environment in which the apparatus is installed; therefore, it is impossible for all apparatus to output images of predetermined densities in accordance with the supplied image data.

Under the circumstances, conventional image recording apparatus are adapted to be such that the density correcting conditions for outputting images of predetermined densities according to image data are set for each apparatus and that an output image is produced after the image data are corrected or density corrected (the step generally referred to as "calibration") in accordance with the thus set density correcting conditions.

As a further problem, the condition of a particular image recording apparatus is variable not only with the progress of the recording operation but also with aging and, hence, it is difficult to ensure that images of predetermined densities are kept produced over an extended period. Consider, for example, the aforementioned thermal recording apparatus; as repeated recording is performed, the glaze on the thermal head is stained or worn or operating parameters such as the resistances of heating elements will change and, in addition, the environmental conditions (in particular, temperature) will also change; as a result, given the same image data, the density of output image will vary with aging. It is therefore necessary that the density correcting conditions be updated periodically.

Conventionally, in order to set (or update) the density correcting conditions, an individual image recording apparatus is adapted to output a chart for setting the density correcting conditions (i.e., a density correcting chart) which has images of various densities recorded thereon, And the densities of images recorded on the chart are measured with a densitometer and compared with the densities of the images which are to be recorded with the apparatus (namely, the image density in accordance with the image data); the results of the comparison are plotted on a graph to construct a calibration curve.

However, densitometers in common use today are designed to operate on the basis of the images produced by using silver halides as means of color formation in the wet system and correct data can not be obtained consistently if such densitometers are used to measure the densities of images produced by color formation with dyes as in thermal recording systems.

Stated more specifically, the sensitivities of densitometers in common use today are generally variable with wavelength; however, in color formation with silver halides in the wet system, absorption of light is fixed and independent of wavelength, so the results of image density measurement are consistently in agreement with the visual density. On the other hand, color formation with dyes involves the wavelength dependency of absorption and the results of image density measurement with a densitometer will differ from the visual density.

Consider, for example, two images, one being an image having a visual density of 2.0 that has been produced as a result of color formation with silver halides in the wet system and the other being an image of the same visual density which has been produced by color formation with dyes. If these images are measured with the same densitometer, the image density produced by color formation with silver halides in the wet system takes the value 2.0 which is equal to the visual density; however the image density produced by color formation with dyes is generally lower (e.g. 1.8). Such differences in the data of measurement also occur between densitometers.

Under the circumstances, the image recording system that uses a recording material capable of color formation by means of dyes has had the problem that if the density correcting conditions are set in accordance with the results of densitometer measurements on the density correcting chart, the correct density correcting conditions cannot be set and it is impossible to record appropriate and high-quality images which comply with the supplied image data, as typically exemplified by the increase in the overall density of the recorded image.

Various known methods are available for setting the density correcting conditions, such as by using a dedicated algorithm (i.e., a density correcting algorithm) and the methods in ordinary use are so set that they are adapted to a system in which the image density increases gradually from a recording energy value of zero as simulating the image recording that uses silver salt photographic materials in the wet system and in which the image density increases gradually with the increasing amount of recording illumination from zero.

However, in a thermal recording system of the type described above, the recording energy or thermal energy has a threshold in color formation and no color forms if the supplied recording energy is below the threshold but once it is reached, color formation takes place abruptly and the slope of the increase in image density is also steep.

Therefore, if the density correcting conditions are set by the ordinary methods, satisfactory gradation cannot be reproduced and particularly in the highlight density area (the brightest area) near the threshold, the gamma value increases and delicate tones cannot be reproduced, thereby making it impossible to record images of high quality.

In thermal recording apparatus, pulse width or pulse numbers modulation is performed with respect to the image data and the pulses thus modulated are employed to control the generation of heat from the individual heating resistors such that a predetermine gradation is represented in the recorded image for a predetermined density range.

A typical method of controlling the gradation of the image to be recorded will now be described with particular reference to pulse width modulation.

FIG. 13 shows the concept of a circuit for performing the control of heat generation from individual heating resistors by means of pulse width modulation. Shown by 118 in FIG. 13 is control circuit that is provided for each of the heating resistors 120 and it is composed of a pulse generator 122 which, in response to a control clock, generates pulses having a pulse width associated with the image data of interest and a switching element 124 which, in response to the pulses delivered from the pulse generator 122, controls the application of an electric current to a particular heating resistor 120.

The operation of the control circuit 118 may be understood from the timing chart shown in FIG. 14; the pulse generator 122 counts heating control clocks and outputs pulses having widths associated with the image data. In the illustrated case, the switching element 124 is turned on for a time period corresponding to the width of "high-level" pulses being produced from the pulse generator 122 and, conversely, it is turned off for a time period corresponding to the width of "low-level" pulses. Thusly, the heating resistor 120 is supplied with an electric current for a predetermined time by means of the switching element 124 and heated to a predetermined period temperature in accordance with this time period of energization.

Consider, for example, a thermal recording apparatus which, as shown in FIG. 15(a), reproduces 1,024 tones for an image density range of D=0–3. If the pulse width required for recording an image density of D=3 is expressed as a maximum heating time, the pulse generator 122 will output pulses ranging in width from zero to the maximum heating time depending upon specific image data. In this case, the density of the image to be recorded ranges from D=0 to D=3 and the gradation of the image will accordingly change from zero to 1,023 tones.

Therefore, the oscillation frequency of heating control clocks is determined such that the pulse generator 122 will count 1,023 heating control clocks when the width of pulses being produced from the pulse generator 122 has become equal to the maximum heating time.

Thus, in a thermal recording apparatus of the type that uses a thermal head capable of being controlled by the control circuit 118 which adopts the pulse width modulation system, the pulse width is changed in accordance with the image data of interest, thereby controlling as required the gradation for the recorded image.

In fact, however, due to the instrumental variability among thermal recording apparatus such as the scattering of the resistance values of the respective heating resistors 120 or on account of the differences in operating parameters such as the sensitivity of individual thermal films, the maximum energy required to record an image of the maximum density will change and so does the maximum heating time required. If, in spite of these changes, one intends to reproduce a maximum image density of D=3, as many as 1,024 tones have to be assigned to the required maxim heating time and if the required heating time is short, the number of tones will decrease as explained below.

If the required maximum heating time becomes short as shown in FIG. 15(b) for the reason set forth in the preceding paragraph, the number of heating control clocks being counted by the pulse generator 122 must be curtailed in order to reduce the width of pulses being produced from the pulse generator 122; but then, the number of tones that can be represented in the recorded image may decrease to, for example, 800 tones in the illustrated case, thereby making it impossible to represent the required 1,024 tones.

Also available in the art is a thermal recording apparatus that performs pulse intensity (amplitude) modulation with respect to the supply power to the head such that the intensity modulated image data pulses are used to control the generation of heat from the individual heating resistors 120 such that a predetermined gradation is represented in the recorded image for a predetermined density range.

However, this type of thermal recording apparatus which adopts pulse intensity modulation in controlling the gradation of the recorded image has another problem in that the inevitable need to employ means of adjusting the line voltage adds to the cost of the power circuit.

Various kinds of the problems described above would be present not only in the case of the image recording that employs the recording materials which produce densities by color formation with dyes, but also in the case of the image recording that employs the recording materials in the dry system which is not subjected to the wet processing.

SUMMARY OF THE INVENTION

The prevent invention has been accomplished under these circumstances and has as a first object providing a method of density correction which, when applied to an image recording system that produces density (forms image) in a dry system, is capable of setting the appropriate density correcting conditions in accordance with the specific recording apparatus used irrespective of the individual differences of densitometers employed in setting the density correcting conditions and which therefore performs satisfactory density correction to enable consistent recording of high-quality images in accordance with the image data supplied from an image supply source.

A second object of the invention is to provide an image recording apparatus that utilizes the stated method of density correction.

A third object of the invention is to provide a method of density correction which, when applied to image recording, is capable of satisfactory reproduction of highlight density areas to thereby enable consistent recording of high-quality images featuring good tone reproduction.

A fourth object of the invention is to provide a method of tone reproduction which, when performed with thermal recording apparatus that employ either width or pulse numbers modulation to control the generation of heat from individual heating resistors in a thermal head, is capable of representing a predetermined maximal number of tones in the recorded image over a predetermined density range irrespective of the operating conditions such as the instrumental variability between thermal recording apparatus or operating parameters such as the sensitivity difference between thermal films.

In order to attain the first object of the invention, there is provided in accordance with a first embodiment a method of correcting a density of an image to be recorded on a recording material comprising the steps of:

outputting a density correcting chart for setting density correcting conditions in an image recording apparatus;

measuring the image densities on said density correcting chart with a densitometer; and setting the density correcting conditions for image recording in said apparatus using values of said density measurement; wherein the image densities on a density correcting reference chart that have known densities which are associated with a visual density are measured with the densitometer for use in measuring the image densities on said density correcting chart;

correcting conditions for correcting the values of the density measurement with said densitometer such that they coincide with the image densities on said density correcting reference chart are constructed from the image densities on said density correcting reference chart and the values of the density measurement with said densitometer; and said density correcting conditions are set in accordance with the thus constructed correcting conditions.

Preferably, the recording material uses dyes to form a generally black color.

Preferably, the recording material is a light-sensitive and/or thermal recording material on which the image is recorded with at least one light beam and which are processed thermally to develop the image.

Preferably, the recording material is a light-sensitive and/or thermal recording material on which the image are recorded with heat of laser beam or a thermal head.

Preferably, the recording material is a thermally processable light-sensitive material on which the image is recorded with at least one light beam.

Preferably, the recording material is a thermally processable light-sensitive material on which the image is recorded with heat of laser beam or a thermal head.

In order to attain the second object of the invention, there is provided in accordance with a second embodiment an image recording apparatus using a recording material comprising:

means for outputting a density correcting chart;

a densitometer for measuring image densities on said density correcting chart;

a density correcting reference chart that have known densities which are associated with a visual density;

means for compensating the densitometer in which correcting conditions for correcting values of density measurement with said densitometer such that they coincide with image densities on said density correcting reference chart are set from the values of the density measurement on said density correcting reference chart with said densitometer and the image densities on said density correcting reference chart; and setting means which measures the image densities on the density correcting chart with said densitometer, which corrects the values of the density measurement with said densitometer in accordance with the correcting conditions set by said densitometer compensating means, and which sets density correcting conditions for image recording on the basis of the corrected values of the density measurement.

In order to attain the third object of the invention, there is provided in accordance with a third embodiment a density correcting method for use in thermal image recording in which those locations of a thermal recording material which correspond to the images to be recorded are heated with a thermal head so as to perform image recording on said thermal recording material, comprising the steps of:

setting image data to image density transforming conditions that have been expanded along a axis of input image data such that a threshold of the image data which corresponds to a minimal recording energy for color formation to occur in said thermal recording material will be equivalent to minimal density data;

setting provisional density correcting conditions using said image density transforming conditions;

setting density correcting conditions by reducing said provisional density correcting conditions along a axis of output image data such that said threshold will be equivalent to minimal density data for the output image data; and performing density correction on the basis of said density correcting conditions.

In order to attain the fourth object of the invention, there is provided in accordance with a fourth embodiment a method of gradation control in pulse modulation on a thermal recording apparatus in which heating control clocks are counted such that pulse width modulation or pulse number modulation is performed with respect to image data to generate pulses having a pulse width or number that corresponds to said image data and in which the generated pulses are used to control heat generation from individual heating resistors that compose a glaze on a thermal head, wherein an oscillation frequency of said heating control clocks is changed in accordance not only with the pulse width or number that are required to record images at maximum density but also with number of tones in the images to be recorded.

DETAILED DESCRIPTION OF THE INVENTION

The method of density correction and the image recording apparatus of the invention will now be described in detail with reference to the preferred embodiments shown in the accompanying drawings.

Figure 1:
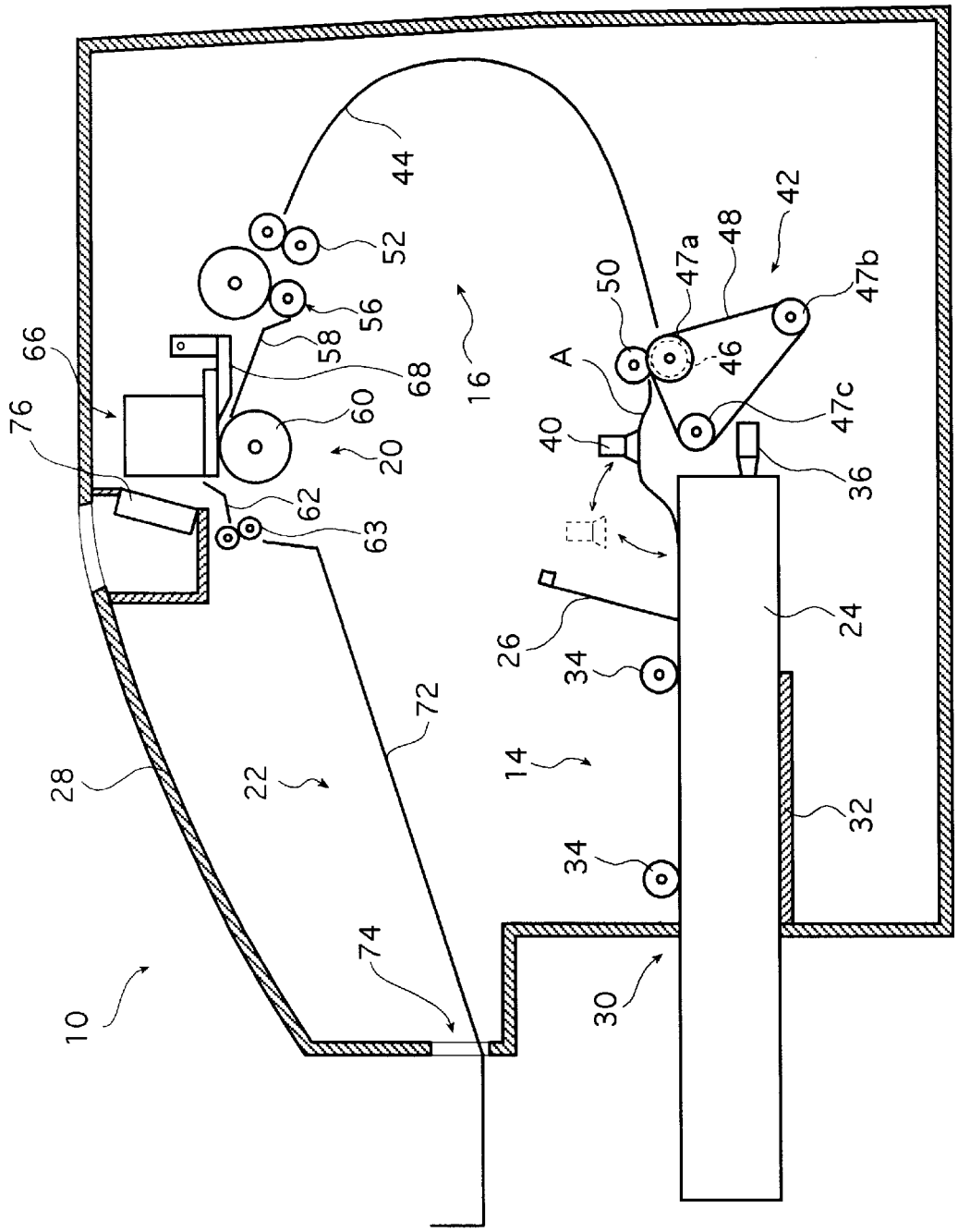
FIG. 1 shows the concept of an exemplary thermal recording apparatus with which the density correcting method of the invention can be implemented.

FIG. 1 shows schematically a thermal recording apparatus as an example of the image recording apparatus with which the density correcting method of the invention can be implemented.

While the following description is made with reference to thermal image recording which is a representative case of image recording in a dry system, especially the image recording based on color formation by dyes, it should be noted that the density correction method of the invention and the image recording apparatus for implementing the method are in no way limited to this particular case and the concept of the invention is advantageously applicable to various kinds of image recording that employ those recording materials in the dry system which is not subjected to the wet processing.

As the recording materials capable of being used in the invention, not only the recording materials which produce a color, for example, a generally black color with dyes used as color forming means, but also light-sensitive and/or thermal (heat-sensitive) recording materials on which the images are recorded with at least one light beam such as the laser beam and which are processed thermally to develop and/or on which the images are recorded with the heat of the light beam such as the laser beam or the thermal head, and thermally processable light-sensitive recording materials on which the image are recorded with at least one light beam such as the laser beam and which are processed thermally to develop and/or on which the images are recorded with the heat of the light beam such as the laser beam or the thermal head can be illustrated.

One example of the light-sensitive and/or thermal recording material used in the invention is a multicolor or monochrome recording material disclosed in Japanese Patent Application No. 08-333724 filed by the assignee. This recording material is a multicolor or monochrome recording material having an image recording layer on its support, wherein the image recording layer comprises in addition to heat responsive microcapsules and a colorless dye encapsulated therein and acting as electron donor, a developer acting as electron acceptor, a polymerizable vinyl monomer, and a photopolymerization initiator such as an organic borate salt compound.

One example of the thermally processable light-sensitive material used in the invention is a recording material having an image recording layer and at least one layer on one of the support surfaces, wherein the image recording layer comprises an organic silver salt, a reducing agent of the organic silver salt and a binder more than 50% of which is composed of a latex, and optionally the image recording layer or at least one layer comprises at least one of a color tone agent, a polyhalogen compound and silver halide particles, and preferably the latex constituting the binder of the image recording layer is a polymer having less than 2% by weight of equilibrium moisture as measured at 25° C., 60% RH. The organic silver salts are preferably those of aliphatic carboxylic acids and aromatic carboxylic acids. Preferred examples of silver salts of the aliphatic carboxylic acids include silver behenate, silver arachidate, silver stearate, silver oleate, silver laurate, silver caproate, silver myristate, silver palmitate, silver maleate, silver fumarate, silver tartrate, silver linolenate, silver butyrate and silver camphorate, and mixtures thereof.

One example of the thermal recording materials is a thermal recording material disclosed in the specification of Japanese Patent Application No. 06-219919 filed by the assignee. This thermal recording material comprises a support made of a resin film such as a transparent polyethylene terephthalate (PET) film and a paper, and a thermal recording layer of water content of no more than 6%, surface of the support, wherein the thermal recording layer comprises a thermal color generation layer generating a color by contacting a color generator and color developer each other, which are isolated each other at a room temperature, by means of heating.

The thermal recording apparatus generally indicated by 10 in FIG. 1 (which is hereunder referred to simply as "recording apparatus 10") will record monochromatic images by performing thermal image recording on thermal recording materials (i.e., a thermal recording layer formed on a base such as a resin film or paper) as exemplified by thermal recording films which are cut sheets of a predetermined size such as B4. The films are hereunder referred to as "thermal film A". The apparatus comprises a loading section 14 where a magazine 24 containing thermal films A is loaded, a feed/transport section 16, a recording section 20 performing thermal image recording on thermal films A by means of the thermal head 66, and an ejecting section 22.

In such a recording apparatus 10, thermal films A are transported to the recording section 20 by the feed/transport section 16. A thermal film A is transported in a direction perpendicular to the direction in which the glaze 66a extends (direction perpendicular to the papers of FIGS. 1 and 2), with the thermal head 66 pressed against the thermal film A, and the respective heat generating elements are heated in accordance with the image to be recorded to accomplish thermal image recording on the thermal film A.

The thermal films A comprise respectively a substrate consisting of a transparent film such as a transparent polyethylene terephthalate (PET) film, which is overlaid with a thermal recording layer. The thermal recording layer uses dyes as color forming means.

Typically, such thermal films A are stacked in a specified number, say, 100 to form a bundle, which is either wrapped in a bag or bound with a band to provide a package. As shown, the specified number of thermal films A bundled together with the thermal recording layer side facing down are accommodated in the magazine 24 of the recording apparatus 10, and they are taken out of the magazine 24 one by one to be used for thermal recording.

The magazine 24 is a case having a cover 26 which can be freely opened. The magazine 24 containing thermal films A is loaded in the loading section 14 of the recording apparatus 10.

The loading section 14 has an inlet 30 formed in the housing 28 of the recording apparatus 10, a guide plate 32, guide rolls 34 and a stop member 36. The magazine 24 is inserted into the recording apparatus 10 via the inlet 30 of the loading section 14 in such a way that the portion fitted with the cover 26 is coming first; thereafter, the magazine 24 as it is guided by the guide plate 32 and the guide rolls 34 is pushed until it contacts the stop member 36, whereupon it is loaded at a specified position in the recording apparatus 10.

The feed/transport section 16 has the sheet feeding mechanism using the sucker 40 for grabbing the thermal film A by application of suction, transport means 42, a transport guide 44 and a regulating roller pair 52 located in the outlet of the transport guide 44; the thermal films A are taken out of the magazine 24 in the loading section 14 and transported to the recording section 20.

The transport means 42 is composed of a transport roller 46, a pulley 47a coaxial with the roller 46, a pulley 47b coupled to a rotating drive source, a tension pulley 47c, an endless belt 48 stretched between the three pulleys 47a, 47b and 47c, and a nip roller 50 that is to be pressed onto the transport roller 46. The thermal film A is transported with the advancing end of the film A fed by the sucker 40 being pinched between the transport roller 46 and the nip roller 50.

When a signal for the start of recording is issued, the cover 26 is opened by the OPEN/CLOSE mechanism (not shown) in the recording apparatus 10. Then, the sheet feeding mechanism using the sucker 40 picks up one sheet of thermal film A from the magazine 24 and feeds the forward end of the sheet to the transport means 42 (to the nip between rollers 46 and 50).

At the point of time when the thermal film A has been pinched between the transport roller 46 and the nip roller 50, the sucker 40 releases the film, and the thus fed thermal film A is transported to the regulating roller pair 52 by the transport means 42 as it is guided by the transport guide 44.

At the point of time when the thermal film A to be used in recording has been completely ejected from the magazine 24, the OPEN/CLOSE mechanism closes the cover 26. The distance between the transport means 42 and the regulating roller pair 52 which is defined by the transport guide 44 is set to be somewhat shorter than the length of the thermal film A in the direction of its transport. The advancing end of the thermal film A first reaches the regulating roller pair 52 by the transport means 42. The regulating roller pair 52 are normally at rest. The advancing end of the thermal film A stops here and is subjected to positioning.

When the advancing end of the thermal film A reaches the regulating roller pair 52, the temperature of the thermal head 66 (glaze 66a) is checked and if it is at a specified level, the regulating roller pair 52 start to transport the thermal film A, which is transported to the recording section 20.

Figure 2:
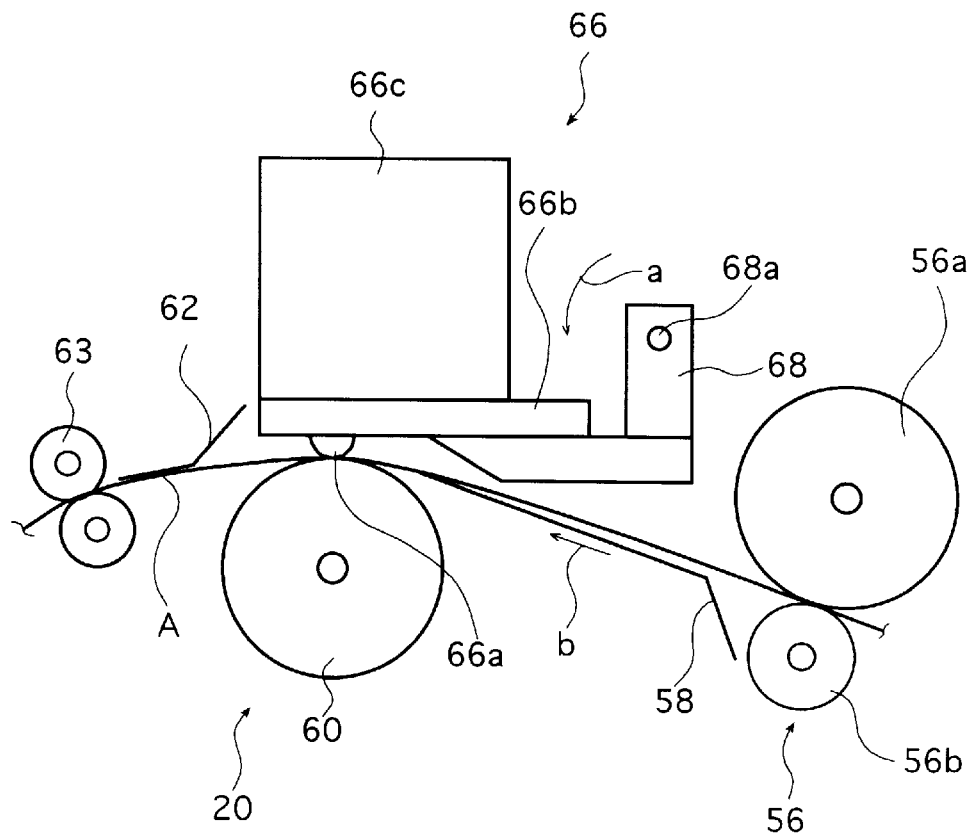
FIG. 2 shows the concept of an exemple of the recording section of the thermal recording apparatus shown in FIG. 1.

FIG. 2 shows schematically the recording section 20. As shown, the recording section 20 has the thermal head 66, a platen roller 60, a cleaning roller pair 56, a guide 58, a fan 76 for cooling the thermal head 66 (see FIG. 1), a guide 62, and a transport roller pair 63.

As shown, the thermal head 66 is capable of thermal recording at a recording (pixel) density of, say, about 300 dpi on the thermal films of a given size, for example, B4. The head comprises a thermal head body 66b having a glaze 66a in which the heat generating elements (heat generating resistors) performing one line thermal recording on the thermal film A are arranged in one direction (perpendicular to the papers of FIGS. 1 and 2), and a heat sink 66c fixed to the thermal head body 66b. The thermal head 66 is supported on a support member 68 that can pivot about a fulcrum 68a either in the direction of arrow a or in the reverse direction.

The platen roller 60 rotates at a specified image recording speed while holding the thermal film A in a specified position, and transports the thermal film A in the direction (direction of arrow b in FIG. 2) approximately perpendicular to the main scanning direction in which the glaze 66a extends.

The cleaning roller pair 56 comprises of a sticky rubber roller 56a and a non-sticky roller 56b and the sticky rubber roller 56a will pick up the dirt particles and other foreign matter that have deposited on the thermal recording layer of the thermal film A to thereby ensure that the dirt particles will neither deposit on the glaze 66a nor cause any adverse effects on the image recording process.

Before the thermal film A is transported to the recording section 20 in the illustrated recording apparatus 10, the support member 68 has pivoted to UP position (in the direction opposite to the direction of arrow a) so that the thermal head 66 (glaze 66a) is not in contact with the platen roller 60.

When the transport of the thermal film A by the regulating roller pair 52 starts, said film A is subsequently pinched between the cleaning roller pair 56 and transported as it is guided by the guide 58.

When the advancing end of the thermal film A has reached the record START position (i.e., corresponding to the glaze 66a), the support member 68 pivots in the direction of arrow a and the thermal film A becomes pinched between the glaze 66a on the thermal head 66 and the platen roller 60 such that the glaze 66a is pressed onto the recording layer while the thermal film A is transported in the direction of arrow b by means of the platen roller 60, the regulating roller pair 52 and the transport roller pair 63 as it is held in a specified position by the platen roller 60.

During this transport, the individual heat generating elements (resistors) on the glaze 66a are actuated in accordance with the image data of the image to be recorded to perform imagewise thermal recording on the thermal film A.

In the thermal image recording apparatus which implements the density correcting method of the invention, the thermal image recording operations in accordance with the image data about the image to be recorded are controlled by the recording control system to be described below.

First, the density correcting method according to the first embodiment of the invention and the layout of the recording control system in the image recording apparatus according to the second embodiment which implements the method are described with reference to FIGS. 3–6.

Figure 3:
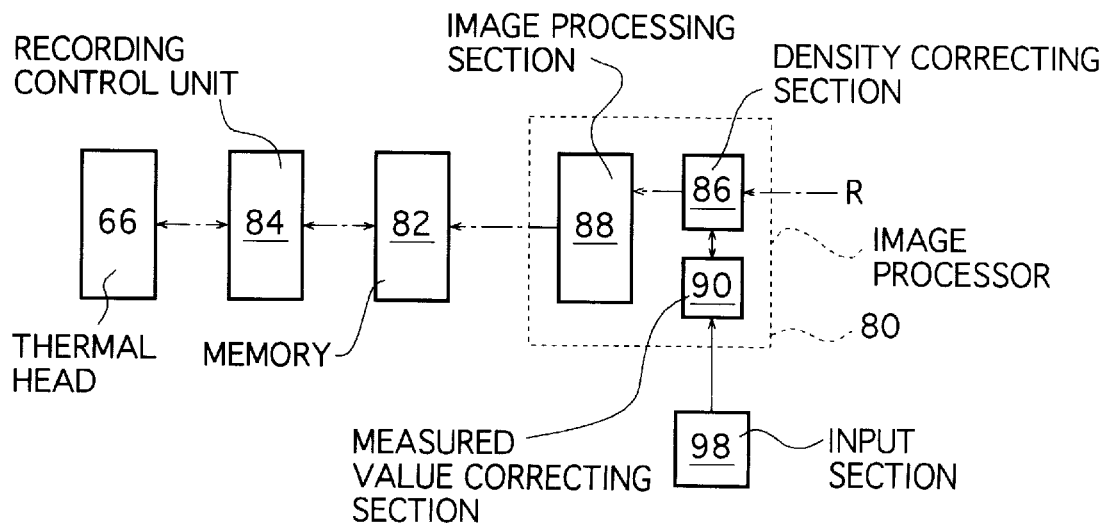
FIG. 3 is a block diagram of an example of the recording control system in the thermal recording apparatus shown in FIG. 1.

As shown in FIG. 3 which is a block diagram of the recording control system, a thermal head 66 has its main body 66b connected to an image processor 80, an image memory 82 and a recording control unit 84.

An image data supply source R which is typically in the form of a CT or MRI provides image data, which are sent to the image processor 80. The image processor 80 is a combination of various kinds of image processing circuits and memories and has a density correcting section 86 and an image processing section 88 which performs various image processing jobs such as sharpness compensation. The image data (image information) received from the image data supply source R are subjected to various corrections and other processing and delivered from the processor 80 as appropriate image data for thermal recording.

The density correcting section 86 is connected to 90 which is a section for correcting the values obtained by measurement with a densitometer (this section is hereunder referred to simply as "measured value correcting section"). The density correcting section 86 and the measured value correcting section 90 are two characterizing portions of the (image) recording apparatus of the invention and responsible for implementing the density correcting method of the invention.

As already mentioned, recording apparatus have individual differences and are installed in different environments; hence, it is impossible for all recording apparatus to output images of predetermined densities that comply with the image data supplied from the source R. In addition, the state of a particular recording apparatus varies with time and in the case of the illustrated recording apparatus 10, the glaze 66a will stain or wear or operating parameters such as the resistances of the heat generating elements will change, also causing time-dependent changes in the recording density associated with the image data.

To cope with this problem, the individual recording apparatus 10 sets the density correcting conditions for outputting images of predetermined densities in accordance with specific image data, typically in the form of density correcting functions or tables and, on the basis of the correction settings, the recording apparatus performs calibration to correct the densities of the supplied image data. What is more, the settings of density correcting conditions have to be updated periodically, for example, every week in order to compensate for the aforementioned changes with aging.

After receiving the image data on the image to be recorded which have been issued from the source R, the density correcting section 86 performs density correction in accordance with correction curves to be described later and outputs the corrected data to the image processing section 88.

The density correcting section 86 performs two additional jobs, i.e., outputting a density correcting chart for setting the density correcting conditions, and setting the density correcting conditions in compliance with the results of density measurement on the chart by means of a densitometer.

The basic procedure of setting the density correcting conditions will proceed as follows.

Figure 4:
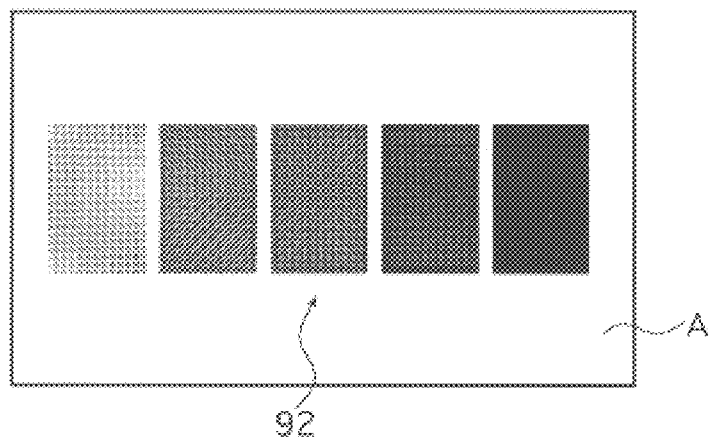
FIG. 4 shows schematically a density correcting chart for use with the thermal recording apparatus shown in FIG. 1.
Figure 5:
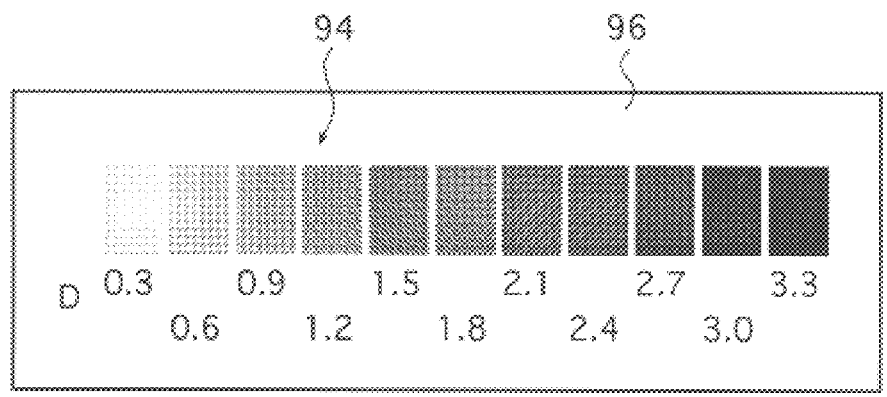
FIG. 5 shows schematically an exemplary reference chart for use in the density correction method of the invention.

When an operator (serviceman) or an overall control for the recording apparatus 10 issues a command for setting (updating) the density correcting conditions, the density correcting section 86 supplies the image processing section 88 with the image data on a density correcting chart which is to be used in the setting of the density correcting conditions. The subsequent procedure is essentially the same as in the ordinary image recording; the image processing section 88 performs predetermined processing on the supplied image data and outputs the processed data into the memory 82, from which it is read by means of the recording control unit 84, whereupon the thermal head 66 starts to operate accordingly and, in the manner already described above, a chart 92 for setting the density correcting conditions which shows images with a gamut of densities as shown in FIG. 4 is recorded on the thermal film A and produced as an output.

Details of the operations of the image processing section 88, memory 82 and recording control unit 84 will be given later.

The densities of the images shown in the chart 92 are measured with a densitometer and the results are entered into the density correcting section 86 by input means 98 such as the operating panel of the recording apparatus 10.

In response to this data entry and on the basis of the results of density measurement and the image density intended by the recording apparatus 10, namely, the image density in compliance with the image data on the density correcting chart which have been issued from the density correcting section 86, said density correcting section 86 sets density correcting conditions, for example, correction curves for the image data, such that the output image to be produced from the recording apparatus 10 will have predetermined densities in compliance with the image data, and the thus set curves are subsequently stored.

As already noted, if the densities of images produced by color formation with silver halides are measured with a densitometer, the results are always in agreement with the visual density; on the other hand, if the densities of images produced by color formation with dyes as in the case of the thermal recording apparatus 10, the results differ from the visual density; in addition, the results of measurements vary from one densitometer unit to another. For these reasons, it has been impossible to set the appropriate density correcting conditions.

In contrast, the recording apparatus 10 of the present invention sets the conditions for correcting the values of density measurement with a densitometer using a sheet 96 (see FIG. 5) which has a reference chart 94 recorded thereon that shows known densities which are keyed to the visual density; in the measured value correcting section 90, the results of measurements with the densitometer are corrected and thence supplied to the density correcting section 86 for setting the density correcting conditions.

The conditions for correcting the values obtained by measurement with a densitometer are set by the following procedure.

First, provide the sheet 96 having recorded thereon the reference chart 94 for densitometer correction that has formed colors with the same dyes as used in the intended image recording, namely, with the dyes used in the illustrated case of thermal recording, and which have known densities in agreement with the visual density. In the case shown in FIG. 5, the sheet 96 is such that the densities (D) of the images of the reference chart 94 are recorded on it; however, this is not the sole case of the invention and densities need not be recorded as long as the densities of the images on the reference chart 94 are known.

The serviceman (or operator) brings the recording apparatus into such a state that it is ready for setting the conditions for correcting the values of measurement with a densitometer (this state may be referred to as "a mode of setting the conditions for measured value correction). Subsequently, the densities of the respective images on the reference chart 94 are measured with the densitometer for use in the setting of the density correction conditions and both the results of the measurement and the image densities on the reference chart 94 are entered by input means 98.

Typical examples of the input means 98 and the means of giving a common of bringing the recording apparatus 10 into the mode of setting the conditions for measured value correction are the operating panel of the apparatus. The results of density measurement on the chart 92 in the aforementioned process of setting the density correcting conditions are also entered by the input means 98.

The results of density measurement and the image densities on the reference chart 94 are sent to the measured value correcting section 90.

Figure 6A:
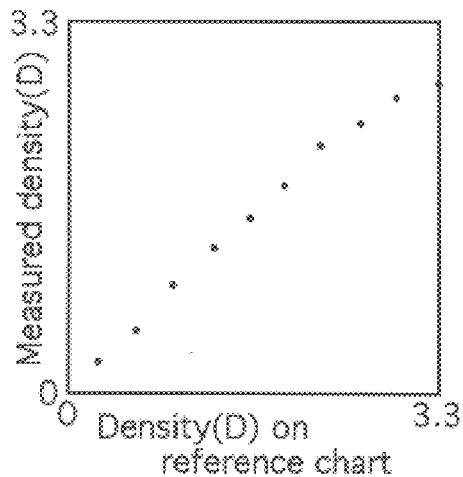
FIG. 6, parts (a) and (b) are graphs illustrating an example of the method of setting the conditions for correcting the values of density measurement by the method of the invention.
Figure 6B:
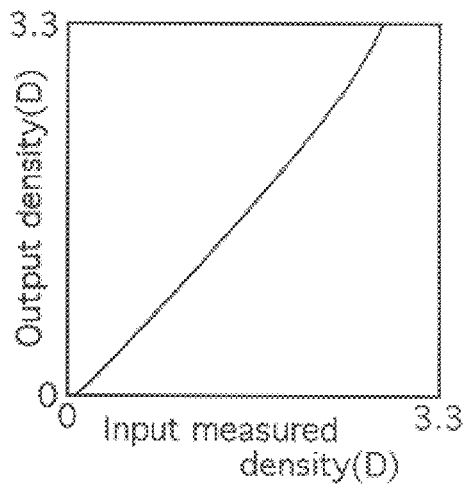

In the measured value correcting section 90, the conditions for correcting the values of measurement with the densitometer such that the results of density measurement with the densitometer are in agreement with the image densities on the reference chart 94 are set on the basis of the entered input data (i.e., the results of density measurement and the image densities on the reference chart 94) and the settings are stored in the form of correction functions, tables and the like. In an exemplary case, if the results of density measurement and the image densities on the reference chart 94 are as shown in FIG. 6(a), the measured value correcting section 90 performs the necessary processing on the values of measurement with the densitometer, constructs a calibration curve of the type shown in FIG. 6(b) and stores it as a table.

In accordance with the thusly set conditions for correcting the values of densitometer measurement, the results of density measurement on the density correcting chart 92 which have been entered by input means in the aforementioned process of setting the density correcting conditions are corrected in the measured value correcting section 90 of the recording apparatus 10 and the thus corrected values are used to set the density correcting conditions in the density correcting section 86.

Therefore, according to the present invention, the appropriate density correcting conditions that suit an image recording apparatus that performs color formation by dyes can be set irrespective of the individual differences between densitometer units and this permits consistent production of high-quality images at densities that comply with the supplied image data.

The conditions for correcting the values of densitometer measurement need not be set periodically as in the case of setting the density correcting conditions but they need be set only in the case where a different densitometer is to be used in setting the density correcting conditions, as well as in the case where the measuring characteristics of the densitometer have changed for a certain reason such as repair. Needless to say, the conditions for correcting the values of densitometer measurement may be set anew if this is found necessary in consideration of the quality of the output image being delivered from the recording apparatus 10.

In the illustrated case, both the results of density measurement and the image densities on the reference chart 94 are entered when setting the conditions for correcting the values of densitometer measurement but this is not the sole case of the invention and only the results of density measurement may be entered into the measured value correcting section 90 which is preliminarily loaded with the image densities on the reference chart 94.

As already mentioned, the image data from the source R such as a CT or MRI is sent to the image processor 80, where the data is density corrected in the density correcting section 86 in accordance with the above-described density correcting conditions and thereafter sent to the image processing section 88.

In response to the received image data, the image processing section 88 performs predetermined image processing jobs such as sharpness compensation for enhancing the image edges, tone correction for producing the appropriate image that complies with parameters such as the gamma value of the thermal film A, temperature compensation for adjusting the energy of heat generation in accordance with the temperature of thermal recording points, shading correction for correcting the density difference between the center and each end of the glaze 66c, resistance correction for correcting the difference between the resistances of heat generating elements at individual thermal recording points, and black ratio correction for ensuring that image data corresponding to the same density will produce color formation at the same density irrespective of the change in the resistance of a particular heat generating element upon heating; if necessary, the image processing section 88 performs formatting (scaling and frame assignment) and the thus processed data are delivered to the image memory 82 as image data for use in the thermal recording by the thermal head 66.

The recording control unit 84 reads the stored image data out of the image memory 82 sequentially line by line in the direction in which the glaze 66c extends and a recording data signal associated with the thus read image data (i.e., the duration of time over which a voltage is applied in accordance with the density of the output image) is sent to the thermal head 66.

The heat generating elements at the respective image recording points of the thermal head 66 are heated to generate heat in accordance with the applied recording data signal and, as already mentioned, thermal image recording is performed on the thermal film A as it is transported by platen roller 60 and other transport means in the direction of arrow b.

The thermal film A with which the thermal image recording has ended is transported by platen roller 60 and transport roller pair 63 as it is directed by guide 62 and eventually ejected onto tray 72 in ejecting section 22. The tray 72 sticks out of the recording apparatus 10 via an ejection port 74 formed in a sidewall of the housing 28 and the image carrying thermal film A slips out of the apparatus 10 via ejection port 74 for recovery.

In the case described above, the densitometer to be used in the process of setting the density correcting conditions is installed exterior to the recording apparatus. Alternatively, the densitometer may be installed within the recording apparatus, i.e., downstream of the thermal head 66 in the illustrated case such that the image densities on the density correcting chart 92 are measured within the recording apparatus so as to set the appropriate density correcting conditions. In this alternative case, the recording apparatus may be adapted to perform calibration of the density correcting conditions on a periodic basis.

If the densitometer is installed within the recording apparatus, the reference chart may be transported in the same way as the recording material such that the conditions for correcting the values of densitometer measurement are automatically set in other respects.

The foregoing are the basis features of the method of correcting densities in accordance with the first embodiment of the invention, as well as the basic structural features of the image recording apparatus for implementing the method in accordance with the second embodiment of the invention.

Figure 7:
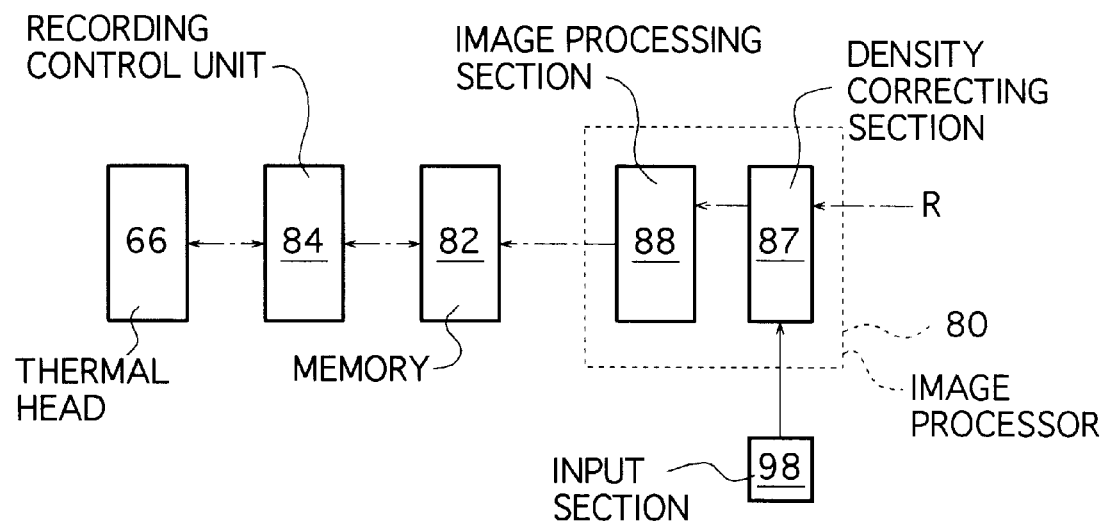
FIG. 7 is a block diagram of another example of the recording control system in the thermal recording apparatus shown in FIG. 1.

We next describe the method of correcting densities in accordance with the third embodiment of the invention by making reference to FIGS. 7 and 8.

The density correcting method of the third embodiment is implemented by the recording control system shown in FIG. 7, which is identical to the system shown in FIG. 3 except that the density correcting section 86 and the section 90 for correcting the values of densitometer measurement are included in a density correcting section 87. Therefore, constituent elements that are the same as those shown in FIG. 3 are identified by like numerals and will not be described in detail.

As shown in FIG. 7, source R supplies the density correcting section 87 with image data on the image to be recorded and after performing density correction on the received image data in accordance with the density correcting conditions to be described later, the density correcting section 87 outputs the image data to the image processing section 88 while, at the same time, it sets the density correcting conditions.

In the third embodiment of the invention, the density correcting conditions may be set by any method, for example, the density correcting method employed in the already described first embodiment.

Stated specifically, the operator or serviceman issues a command for setting (updating) the density correcting conditions, whereupon the density correcting section 87 supplies the image processing section 88 with the image data on the density correcting chart for setting the density correcting conditions. The image processing section 88 performs predetermined processing on the received image data and outputs it to the memory 82 as image data for thermal recording. The recording control unit 84 reads the image data for thermal recording out of the memory 82 and causes the thermal head 66 to operate in accordance with the thus read image data such that a density correcting chart for setting the density correcting conditions which has images of varying densities recorded thereon is recorded on the thermal film A and produced as an output.

The densities of the images on the density correcting chart are measured with a densitometer and the results of measurement are entered into the density correcting section 87 by input means 98 such as the operating panel of the recording apparatus 10.

In response to this data entry and on the basis of the results of density measurement and the image density intended by the recording apparatus 10, namely, the image density in compliance with the image data on the density correcting chart which have been issued from the density correcting section 87, said density correcting section 87 sets the density correcting conditions such that the output image to be produced from the recording apparatus 10 will have predetermined densities in compliance with the supplied image data (i.e., the conditions for correcting the image data), and the thus set conditions are subsequently stored. Density correction is then performed on the basis of the stored density correcting conditions.

As already mentioned, the color formation in thermal recording involves a certain threshold of recording (thermal) energy such that once the threshold is reached, color formation takes place abruptly and the slope of the increase in image density is also steep. Therefore, if the density correcting conditions are set in the usual manner, satisfactory gradation cannot be reproduced and particularly in the highlight density area, the gamma value increases and delicate tones cannot be reproduced, making it impossible to record images of high quality.

In contrast, in the density correcting method according to the third embodiment of the invention, image data to density transforming conditions in association with the threshold are expanded in a direction parallel to the axis of the input image data (the expansion may be designated as "pre-processing"), provisional conditions for density correction are set using the expanded image data to density transforming conditions, and the provisional density correcting conditions in association with the threshold are reduced in a direction parallel to the axis of the output image data (the reduction may be designated as "post-processing"), and by adopting this technique, one can achieve consistent production of high-quality, thermal recorded images that features satisfactory gradation reproduction in the highlight density area.

Figure 8A:
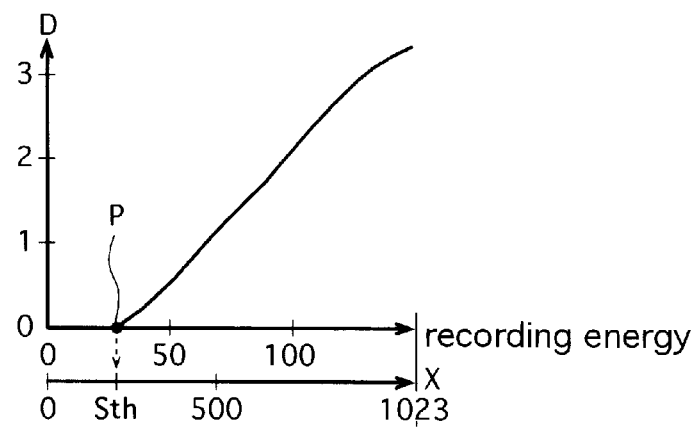
FIG. 8, parts (a)–(d) are graphs illustrating how the density correction method of the invention is operated.

We now describe the method of setting the density correcting conditions in the density correcting section 87 with particular reference to the case where the thermal head 66 in the recording apparatus 10 has a color density (D) vs recording (thermal) energy relationship as shown graphically in FIG. 8(a), with the threshold for color formation falling at point P. It should be noted that if the value of image data $S_{th}$ associated with the threshold for color formation is either at point P or very close to it, the highlight can potentially be fogged and, therefore, in the following description, $S_{th}$ may assume a value slightly smaller than the value corresponding to point P.

Figure 8B:
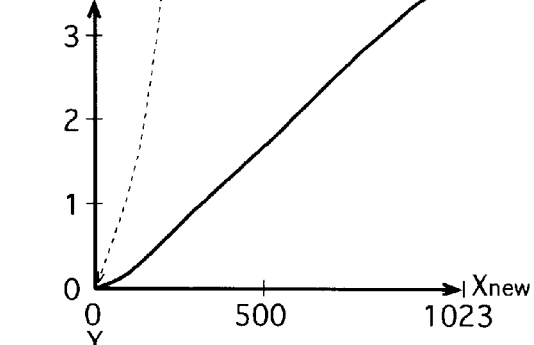

In the illustrated recording apparatus 10, the image data from the source R are sent in a 10-bit digital form representing numbers of 0–1023. Image data $S_{th}$ associated with the threshold for color formation is determined and the graph shown in FIG. 8(a) is pre-processed by being expanded along the axis of the input image data (X-axis) such that the range from $S_{th}$ to 1023 coincides with image data values of 0 to 1023 as shown in FIG. 8(b). In other words, the conditions for image data to density transformation are set by transforming the input image data X shown in FIG. 8(a) to a new value $X_{new}$ by the following equation:

$X_{new}=1023\times([X-S_{th}]/[1023-S_{th}])$

Then, on the basis of the conditions for image data to density transformation that are shown in FIG. 8(b), the aforementioned results of density measurement on the density correcting chart, etc., provisional density conditions are set for the purpose of transforming the supplied image data, or the input image data (X-axis), to density corrected output image data (Y-axis).

This can be accomplished by various known methods of setting the conditions for tone correction in printers or the like that employ silver halide films, as exemplified by the method of setting the density correcting conditions using a tone correcting algorithm that is set in adaptation to a color forming system in which the image density increases gradually from the recording energy of zero. A specific example of setting such density correcting corrections may be found in Unexamined Published Japanese Patent Application (Kokai) 59-83150.

In the system shown in FIG. 7, the source R supplied 10-bit digital image data to the density correcting section 87, which not only performs image correction but also transforms the received image data to 12-bit digital data for the performance of various subsequent image processing jobs. To this end, the provisional conditions for density correction which are shown in FIG. 8(c) are such that the output image data are 12-bit digital data representing numbers 0–4095.

Figure 8C:
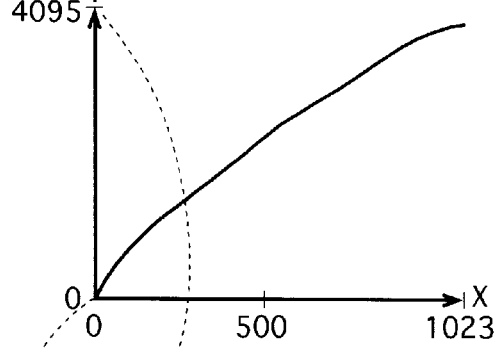
Figure 8D:
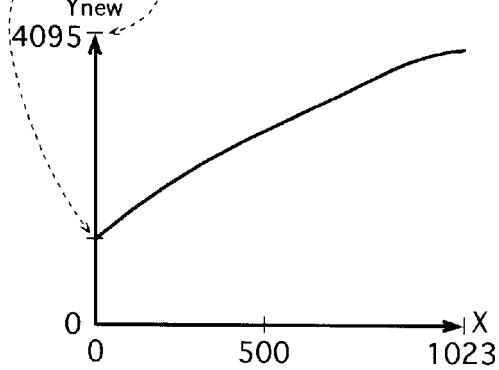

Finally, as shown in FIG. 8(d), post-processing for completing the density correcting conditions is performed by reducing the provisional density correcting conditions shown in FIG. 8(c) along the axis of the output image data (Y-axis) such that the output image data $Y_{new}$ will cover the range from the image data $S_{th}$ (which is associated with threshold P but quadrupled because of the transformation from 10-bit to 12-bit digital data) to 4095. In other words, the density correcting conditions are completed by transforming the output image signal Y shown in FIG. 8(c) by the following equation:

$$Y_{new} = Y \times ([1023 - S_{th}]/1023) \times 4 + S_{th} \times 4$$

The thus completed density correcting conditions are used to perform density correction on the input image data supplied to the density correcting section 87.

The foregoing are the basic features of the density correcting method according to the third embodiment of the present invention.

We now describe with reference to FIGS. 9–15 the method of gradation control in pulse modulation which is a density correction method according to the fourth embodiment of the invention.

In the method of gradation control in pulse modulation according to the fourth embodiment of the invention, the oscillation frequency of heating control clocks is changed appropriately in accordance with the pulse width or number required to record an image of maximum density (i.e., the maximum heating time for image recording) and the number of tones in the image to be recorded, for example, by dividing the maximum heating time by the number of tones.

According to this method of gradation control in pulse modulation, the oscillation frequency of heating control clocks is changed in accordance with the maximum heating time for image recording and the number of tones in the image to be recorded and, hence, desired images can be recorded with a maximum predetermined number of tones being represented over a predetermined density range.

It should be noted that with a thermal recording apparatus which implements the method of gradation control in pulse modulation according to the fourth embodiment of the invention, thermal recording in association with the input image data is performed by the recording control system shown in FIG. 9 (which is hereinafter designated as a "image data processing system").

Figure 9:
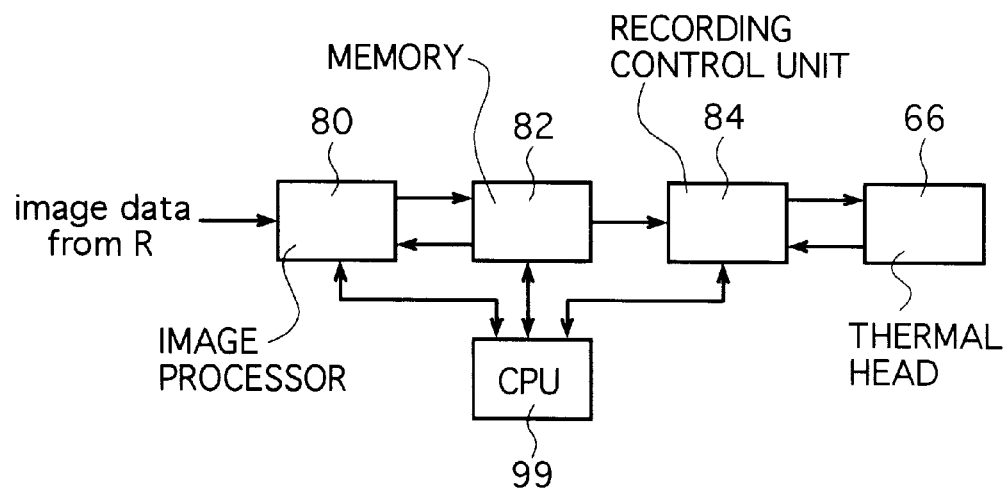
FIG. 9 shows the concept of another example of the data processing system in the thermal recording apparatus shown in FIG. 1.

It should also be noted that the image data processing system shown in FIG. 9 has essentially the same construction as the recording control system shown in FIG. 3, except that it includes a CPU 99. Therefore, constituent elements that are the same as those shown in FIG. 3 are identified by like numerals and will not be described in detail.

The image data processing system shown in FIG. 9 comprises an image processing unit 80 which performs various correcting (image processing) jobs on the image data supplied from a source such as a CT or MRI, an image memory 82 for storing the corrected image data, and a recording control unit 84 for controlling the thermal head 66 on the basis of the image data stored in the image memory 82 (said control unit is hereunder referred to as a "head control section").

On the basis of various kinds of correcting data, the temperature of the thermal head 66 and other factors, the image processing unit 80 performs various processing jobs including: shading correction for correcting the uneven density due to the thermal head 66; sharpness compensation for enhancing the image edges; tone correction in accordance with the gamma value and other characteristics of the thermal film A; temperature compensation for adjusting the heating energy in accordance with the temperature of the heat generating resistors; resistance correction for correcting the difference between the resistances of individual heat generating resistors; and black ratio correction for correcting the black ratios of image data which are to produce the same recording density.

The image data that have been subjected to various kinds of correction in the image processing unit 80 are stored temporarily in the image memory 82. Then, in the head control section 84, the generation of heat by the individual heat generating resistors which compose the glaze 66a on the thermal head 66 is controlled on the basis of the corrected image data in the image memory 82 so as to form the intended image. The operations of the image processing unit 80, the image memory 82 and the head control section 84 are controlled by the CPU 99.

Figure 13:
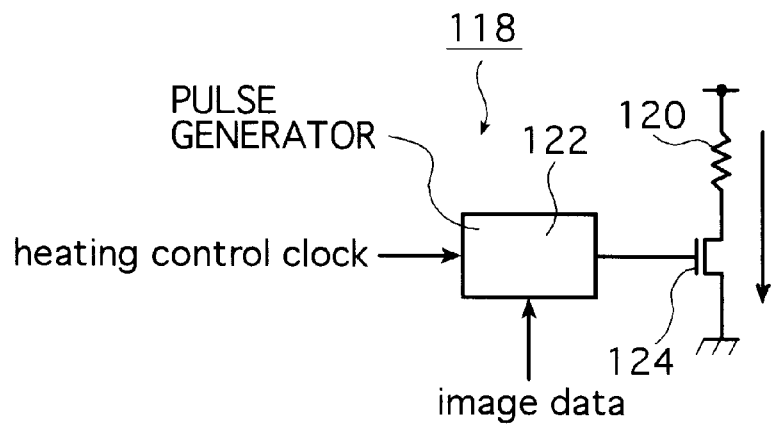
FIG. 13 shows the concept of a control circuit for controlling the generation of heat from individual heating resistors by means of pulse width modulation.
Figure 14:
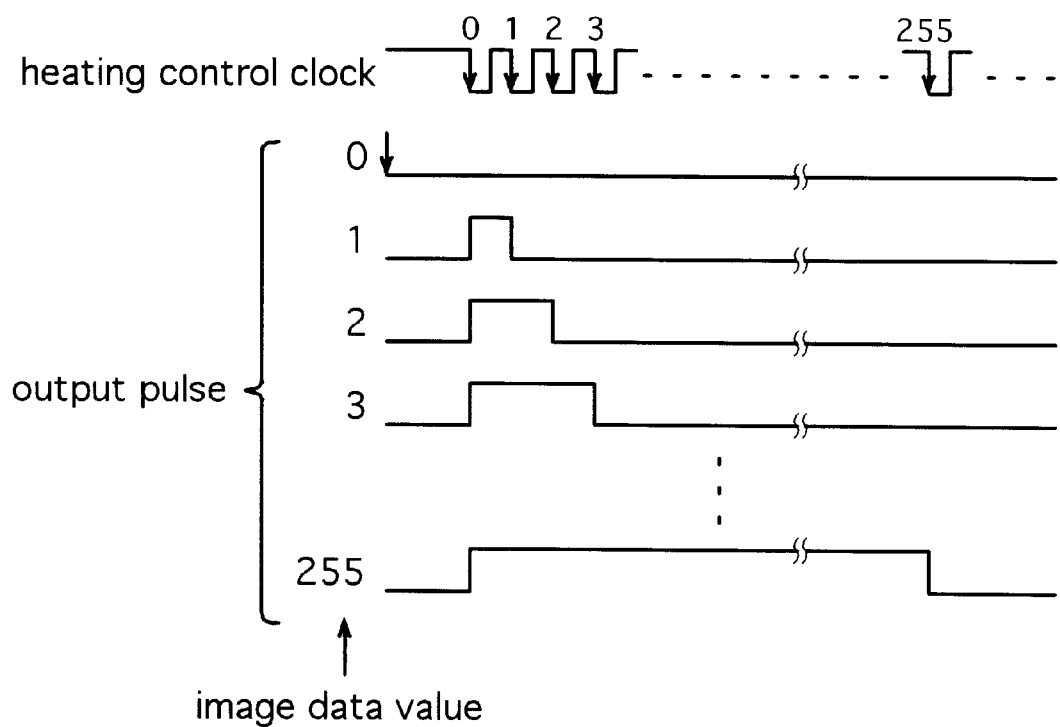
FIG. 14 is a timing chart for a sequence of operations performed by the control circuit shown in FIG. 13.
Figure 15A:
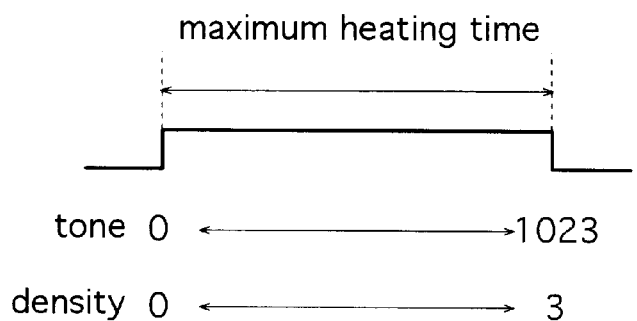
FIG. 15, parts (a) and (b) are diagrams each showing the concept of the relationship between the maximum heating time of a particular head and each of image tone and density.
Figure 15B:
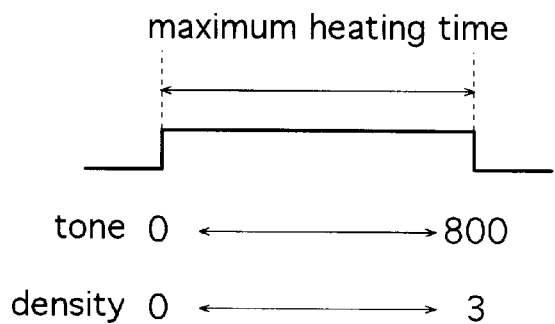

When implementing the method of gradation control in pulse modulation according to the fourth embodiment of the invention, the generation of heat from the individual heat generating resistors is controlled in the head control section 84 by changing the oscillation frequency of heating control clocks to the thermal head 66 as shown in FIG. 13.

The head control section 84 contains a clock generator for controlling the oscillation frequency of heating control clocks.

Figure 10:
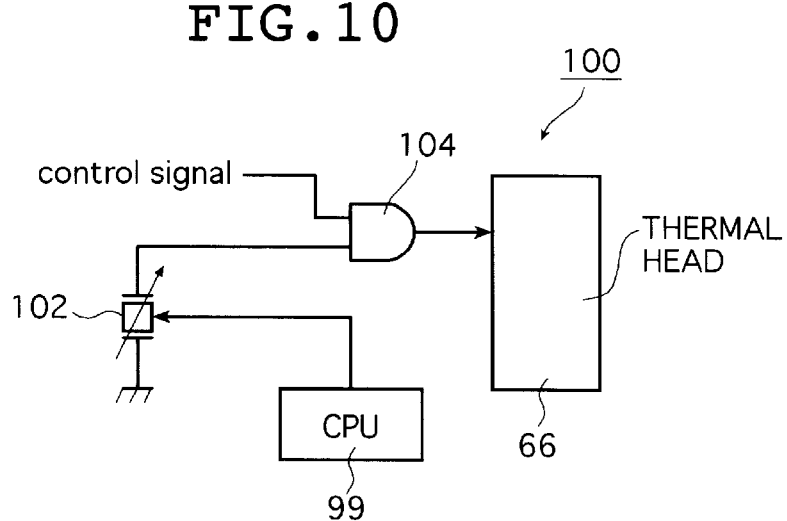
FIG. 10 shows the concept of an exemplary clock generator for use in the head control section of the data processing system shown in FIG. 9.

FIG. 10 is a block diagram showing the concept of an example of the clock generator. The clock generator generally indicated by 100 in FIG. 10 will generate heating control clocks which are to be supplied to the thermal head 66 and includes a variable oscillator 102 and an AND gate 104. A first input terminal of the AND gate 104 is supplied with a control signal whereas a second input terminal of the AND gate is supplied with a clock from the variable oscillator 102. The output terminal of the AND gate 104 produces heating control clocks which are supplied to the thermal head 66.

In the clock generator 100, the oscillation frequency of the clocks delivered from the variable oscillator 102 is controlled appropriately such that a logical sum of the clock and the control signal is delivered as a heating control clock from the AND gate 104.

As already described in connection with the prior art, the thermal head 66 is operated in such a way that the pulse generator counts the heating control clocks and outputs pulses of predetermined pulse widths associated with the input image data, whereby the generation of heat from the individual heat generating resistors is controlled.

Figure 11:
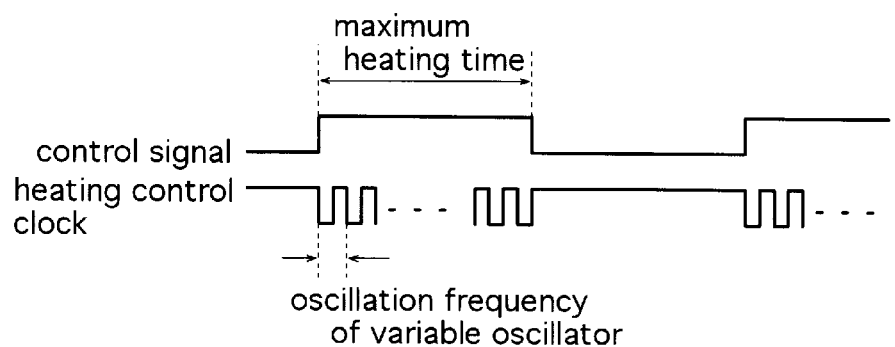
FIG. 11 is a timing chart for an exemplary operation of the clock generator shown in FIG. 10.

FIG. 11 is a timing chart showing an example of the waveforms of the control signal to be supplied to the AND gate 104 and the heating control clocks to be delivered therefrom. As shown, the control signal consists of a high-level portion that lasts as long as the generation of heat from thermal head 66 is controlled (i.e., for a period corresponding to the maximum heating time) and a low-level portion that lasts as long as no control is performed on the generation of heat from the thermal head 66.

The heating control clock is a signal that oscillates at a frequency equal to the oscillation frequency of the variable oscillator 102 as long as the control is at high level and it is kept at a high level (rendered inactive) as long as the control signal is at a low level.

Therefore, in the case of a thermal recording apparatus which is designed to produce 1024 tones for D=0–3 (D is the density of the image to be produced), the oscillation frequency of the clocks to be delivered from the variable oscillator 102 is calculated by dividing the maximum heating time in the thermal head 66 by 1023 (=number of tones minus 1).

Figure 12:
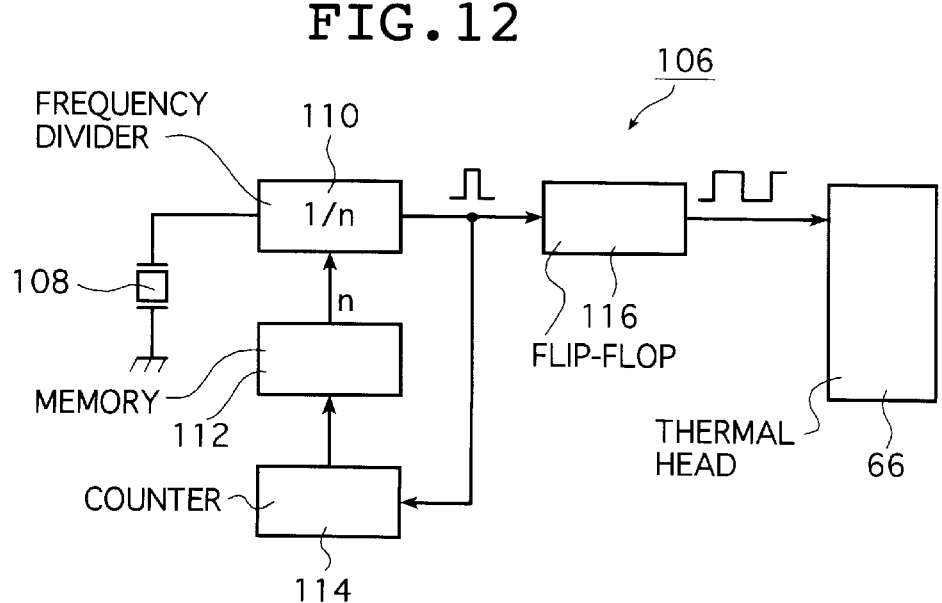
FIG. 12 shows the concept of another example of the clock generator.

FIG. 12 is a block diagram showing the concept of another example of the clock generator. The clock generator generally indicated by 106 in FIG. 12 comprises an oscillator 108, a frequency divider 110, a memory 112, a counter 114 and a flip-flop 116. The clock from the oscillator 108 is fed into the frequency divider 110 and the output of the frequency divider 110 is fed into the counter 114 and the flip-flop 116. The output of the counter 114 is fed into the memory 112 and the output of the memory 112 is fed into the frequency divider 110 and the output of the flip-flop 116 is fed into the thermal head 66 as a heating control clock.

The oscillator 108 in the clock generator 106 outputs clocks of a comparatively high oscillation frequency.

The memory 112 stores previously clock pattern of the type typically shown by a timing chart in FIG. 11 which is determined by a CPU (not shown) in accordance with the maximum heating time for image recording by the thermal head 66 and the number of tones in the image to be recorded, as well the oscillation frequency of the clocks from the oscillator 108.

Consider, for example, the case where the low- and high-level portions of the heating control clock that is delivered as long as the control signal remains at high level both have a pulse width equivalent to three clocks from the oscillator 108 and where the high-level portion of the heating control signal that is delivered as long as the control signal remains at low level has a pulse width equivalent to 10,000 clocks; then, the memory 112 repetitively stores number "three" which represents the number of each of the low- and high-level portions of the heating control clock that is delivered as long as the control signal remains at high level and eventually number "10,000" is stored.

The frequency divider 110 in the clock generator 106 divides the clocking frequency of the oscillator 108 to 1/n, where n is the output of the memory 112. Therefore, if the memory 112 outputs number "three", the frequency divider 110 will output one high-level pulse when three clocks from the oscillator 108 have been counted. If the frequency divider 110 outputs the high-level pulse, the output of the counter 114 is incremented and the memory 112, will produce the next output stored at the address designated by the counter 114.

At the same time, the output of the frequency divider 110 is fed into the flip-flop 116, where it is divided by two and delivered from the flip-flop as a heating control clock. Thus, each time a high-level pulse is delivered from the frequency divider 110, the level of the heating control clock is inverted.

By repeating the above-described procedure, one can generate heating control clocks having a waveform typically shown by a timing chart in FIG. 11.

In the case of a thermal recording apparatus which is designed to produce 1024 tones for D=0–3 (D is the density of the image to be produced), the pulse widths of the low- and high-level portions of the clock pattern to be stored in the memory 112 can be calculated by the following procedure: the maximum heating time in the thermal head 66 is divided by 1023 (=number of tones minus 1); dividing the result by 2 to simulate the performance of the flip-flop 116; and further dividing the result by the frequency of the clocks from the oscillator 108.

In the above calculation, the integral portion of the quotient may be assigned as the pulse width of each of the low- and high-level portions of the clock pattern, with the surplus being added as, for example, "1" to a desired portion of the clock pattern. If, for example, the maximum heating time in the thermal head 66 has increased in the illustrated case, a predetermined number of threes that constitute the clock pattern (3, 3, . . . , 3) to be stored in the memory may be changed to "four".

If this is done, the portions of a clock pattern that have been changed to "four" will have a pulse width of 4, causing a slight increase in the time required to control the generation of heat from the thermal head 66. However, this is not a problem at all if the apparatus is adapted to be such that the clocking frequency of the oscillator 108 is sufficiently increased to ensure that the individual clock patterns to be stored in the memory 112 will have greater values.

As described above, the thermal recording apparatus 10 which implements the method of gradation control in pulse modulation according to the fourth embodiment of the invention is capable of controlling the oscillation frequency of the heating control clocks as appropriate for the maximum heating time for image recording and the number of tones in the image to be recorded; hence, even if the maximum heating time in image recording varies on account of instrumental variability such as scattering in the resistances of individual heating resistors or due to the difference in sensitivity between thermal films to be used, the desired uniformity can be attained not only in the number of tones but also in the recording density.

While the foregoing description of the fourth embodiment has been made with reference to a specific design of the clock generator, it should be understood that all that is needed by the method for gradation control in pulse modulation according to the fourth embodiment is that the oscillation frequency of the heating control clocks be changed as appropriate for the maximum heating time in the thermal head and, therefore, the circuit configuration of the clock generator is not limited at all. It should also be noted that the oscillation frequency of the heating control clocks is preferably set at any suitable time such as during periodical calibrations of the system.

The foregoing description of the fourth embodiment also concerns the case where the method of gradation control in pulse modulation according to that embodiment is applied to a thermal recording apparatus of a type that performs pulse width modulation with respect to the image data and which controls the generation of heat from the individual heat generating resistors by means of pulses having a width associated with the image data. However, it goes without saying that the fourth embodiment of the invention is equally applicable to another type of thermal recording apparatus which performs pulse numbers modulation with respect to the image data and which controls the generation of heat from the individual heat generating resistors by means of pulses having a pulse number associated with the image data.

While the method of the invention for correcting densities as well as the image recording apparatus that is implemented by the method have been described above in detail, it should be noted that the foregoing are not the sole example of the invention and that various improvements and modifications can be made without departing from the scope and spirit of the invention.

As described above in detail, the density correcting method according to the first embodiment of the invention and the image recording apparatus according to the second embodiment ensure that in image recording that accomplishes color formation by means of dyes, the density correcting conditions appropriate to the specific recording apparatus used can be set irregardless of the individual differences of densitometers used in the setting of those conditions and, hence, the intended density correction can be accomplished to ensure that images of high quality are recorded consistently in accordance with the image data supplied from any source.

In addition, the density correcting method according to the third embodiment of the invention ensures that thermal image recording can be accomplished regardless of the threshold in color formation and that, therefore, satisfactory tones can be reproduced even in highlight density areas, thereby achieving consistent formation of high-quality images which feature effective reproduction of the desired gradation.

Further in addition, the method of gradation control in pulse modulation according to the fourth embodiment of the invention is to be applied to a thermal recording apparatus of such a type that pulse width or pulse numbers modulation is performed on the image data to generate pulses having a width or number associated with the input image data and which are employed to control the generation of heat from individual heat generating resistors. According to this method, the oscillation frequency of heating control clocks is changed as appropriate for the maximum heating time in image recording and the number of tones in the image to be recorded and the heating control clocks are counted to perform pulse width or pulse numbers modulation on the image data.

Therefore, by implementing the method of gradation control in modulation pulse according to the fourth embodiment of the invention, the oscillation frequency of the heating control clocks can be changed as appropriate for the maximum heating time in image recording and the number of tones in the image to be recorded and this offers the advantage of producing images with a predetermined gradation in a predetermined density range at all times irrespective of the instrumental variability among thermal recording apparatus, the sensitivity of the thermal film used and other operating factors.

What is claimed is:

1. A density correcting method for use in thermal image recording wherein locations of a thermal recording material which correspond to the images to be recorded are heated with a thermal head so as to perform image recording on said thermal recording material, the method comprising the steps of:

(a) setting transforming conditions for transforming image data to image density, wherein the transforming conditions have been expanded along an axis of input image data such that a threshold of the image data which corresponds to a minimal recording energy for color formation to occur in said thermal recording material is equivalent to minimal density data;

(b) setting provisional density correcting conditions using said transforming conditions;

(c) setting density correcting conditions by reducing said provisional density correcting conditions along an axis of output image data such that said threshold will be equivalent to minimal density data for output image data; and (d) performing density correction based on said density correcting conditions.

2. A method of gradation control in pulse modulation on a thermal recording apparatus, the method comprising the steps:

(a) counting heating control clock pulses such that pulse width modulation or pulse number modulation is performed with respect to image data to generate pulses having a pulse width or number that corresponds to said image data, and (b) controlling heat generation from individual heating resistors that compose a glaze on a thermal head using the pulses generated in said step (a), wherein an oscillation frequency of said heating control clock pulses is changed in accordance not only with the pulse width or number that is required to record images at maximum density but also in accordance with a number of tones in images which are to be recorded.

* * * * *